United States Patent [19]

Goossen

[11] Patent Number: 5,710,656
[45] Date of Patent: Jan. 20, 1998

[54] MICROMECHANICAL OPTICAL MODULATOR HAVING A REDUCED-MASS COMPOSITE MEMBRANE

[75] Inventor: Keith Wayne Goossen, Aberdeen, N.J.

[73] Assignee: Lucent Technologies Inc., Murray Hill, N.J.

[21] Appl. No.: 688,325

[22] Filed: Jul. 30, 1996

[51] Int. Cl.$^6$ .................................................... G02B 26/00
[52] U.S. Cl. .................................................... 359/291; 359/290
[58] Field of Search .................................... 359/290, 291, 359/298, 292, 846

[56] References Cited

U.S. PATENT DOCUMENTS

| | | | |
|---|---|---|---|
| 5,500,761 | 3/1996 | Goossen et al. | 359/290 |
| 5,636,052 | 6/1997 | Arney et al. | 359/291 |

*Primary Examiner*—Loha Ben

[57] ABSTRACT

A method and apparatus for a micromechanical modulator having a reduced-mass multilayer membrane is disclosed. The modulator includes a movable composite membrane suspended over a subtrate. The composite membrane consists of an overlayer and an underlayer. The overlayer is characterized by a thickness that is less than one-quarter of a wavelength of the optical signal being modulated. Under the action of a bias voltage, the movable membrane moves from a quiescent position to a second position closer to the substrate. The modulator is fabricated so that in either the quiescent position or the second position the gap between the composite membrane and the substrate is equal to $d=m\lambda/4-n_s s$ when $n_u$ is about equal to $(n_s)^{0.5}$, where m is an even integer, $\lambda$ is the wavelength of the optical signal being modulated, $n_s$ is the refractive index of the subtrate, $n_u$ is the refractive index of the underlayer, $n_o$ is the refractive index of the overlayer, and s is the thickness of the overlayer. More generally, the gap may be given by $d=m\lambda/4-n_s s+(n_u-n_s^{0.5})(\lambda/10)\sin(4\pi n_o s/\lambda)$.

24 Claims, 4 Drawing Sheets

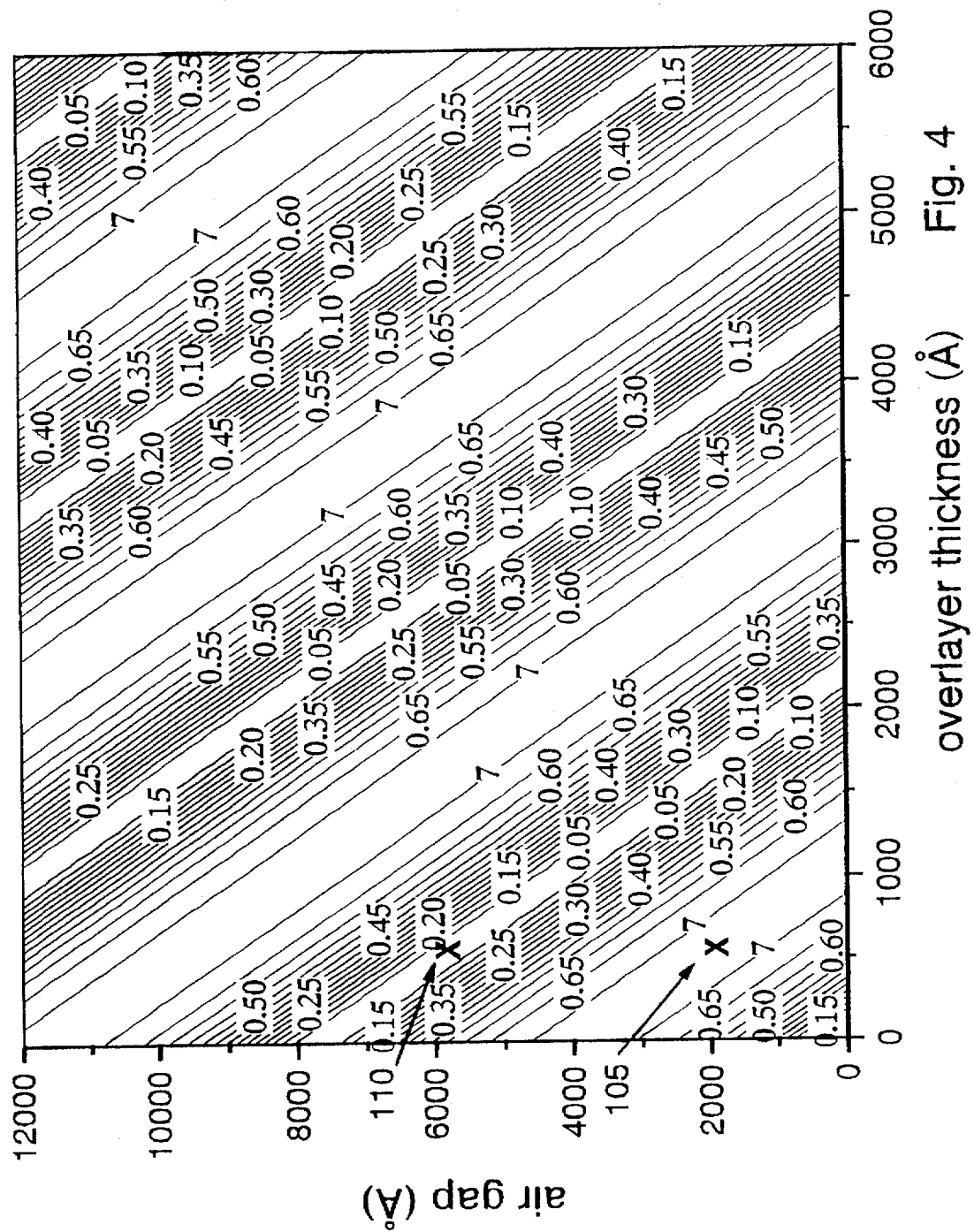

MICROMECHANICAL OPTICAL MODULATOR HAVING A REDUCED-MASS COMPOSITE MEMBRANE

FIELD OF THE INVENTION

The present invention relates generally to improved micromechanical optical modulators.

BACKGROUND OF THE INVENTION

Micromechanical optical modulators can be used in optical communications systems for encoding information onto optical signals. While a variety of modulator designs have been proposed, most include a movable layer, often a membrane, that is suspended over a stationary layer. Typically, the movable layer and the stationary layer are conductive, so that a voltage may be applied to both layers. The applied voltage generates an electrostatic force that causes the membrane to move, from an unbiased position, toward the stationary layer. As the position of the membrane changes relative to the stationary layer, an optical property of the device changes. Such a change can be exploited to cause a change in a measurable property of an optical signal returned from the modulator. In this manner, the optical signal can be modulated, and information encoded thereon.

The modulator membrane usually consists of one or more layers of material. The layers may each be formed of a different material. For example, a two-layer membrane may include a layer of silicon nitride and a layer of polysilicon. Typically, the thickness of each of the membrane layers is one-quarter of a wavelength of the optical signal being modulated. Quarter-wavelength layers are typically specified for optical reasons.

Composite or multi-layer membranes are typically preferred over single layer membranes because they can add a degree of freedom to the modulator design. For example, such composite membranes may allow the designer to independently optimize the mechanical and the optical performance of the modulator by separately controlling the properties of each layer. As more layers are included in the membrane, however, its mass increases. Such an increase in mass reduces the speed of the modulator, which, in many applications, is undesirable.

As such, there is a need for a micromechanical optical modulator having a reduced-mass composite membrane.

SUMMARY OF THE INVENTION

A micromechanical optical modulator having a reduced-mass composite membrane and a method for fabricating the same are disclosed. According to the invention, the modulator comprises a movable composite membrane suspended over a substrate. The composite membrane consists of an overlayer and an underlayer. The overlayer is transparent at the operating wavelengths of the modulator, conductive, and has a refractive index about equal to the refractive index of the substrate. The underlayer is transparent at the operating wavelengths of the modulator and preferably has a refractive index about equal to the square root of the refractive index of the substrate.

The thickness of the underlayer is about one-quarter of a wavelength of the optical signal, as measured in the underlayer. In a departure from typical membrane layers, the overlayer is characterized by a thickness that is less than one-quarter of a wavelength, as measured in the overlayer. The overlayer can be any suitable thickness less than one-quarter wavelength, as dictated by factors such as the manufacturability, the mechanical response and the conductivity of the membrane.

In preferred embodiments wherein the refractive index of the underlayer is about equal to the square root of the refractive index of the substrate, the modulator is fabricated so that the gap between the composite membrane and the substrate is equal to $d_o = m\lambda/4 - n_o s$ in one state of the device, i.e., biased or unbiased, where m is an even integer, $\lambda$ is the wavelength of the optical signal being modulated, $n_o$ is the refractive index of the overlayer and s is the thickness of the overlayer. At $d_o$, the reflectivity of the modulator is zero.

BRIEF DESCRIPTION OF THE DRAWINGS

Further features of the invention will become more apparent from the following detailed description of specific embodiments thereof when read in conjunction with the accompanying drawings, in which like elements have like reference numerals and in which:

FIG. 4 is a contour plot of overall reflectivity as a function of gap size and overlayer thickness;

DETAILED DESCRIPTION

Figure 1:
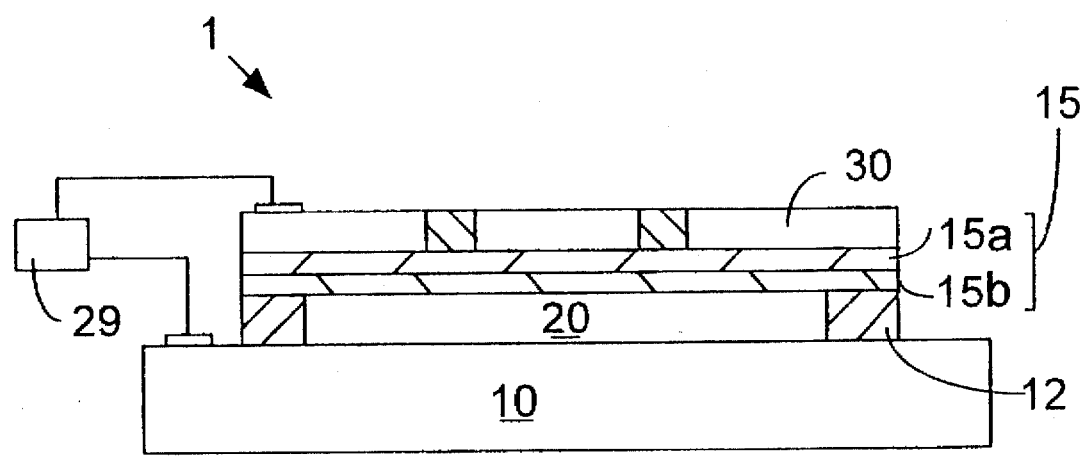
FIG. 1 is a cross-sectional side view, through the line A—A in FIG. 2, of an exemplary optical modulator according to the present invention.
Figure 2:
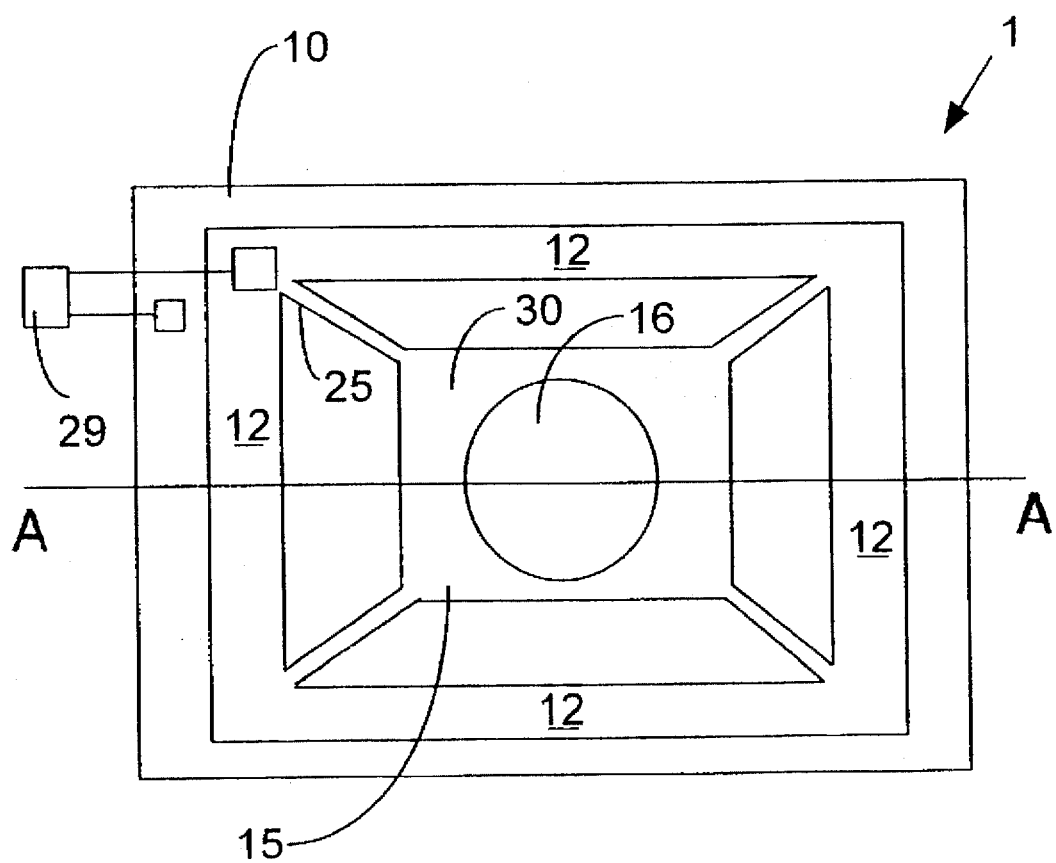
FIG. 2 is a top view of the exemplary modulator of FIG. 1.

As shown in FIG. 1, which is a cross-sectional view through line A—A in FIG. 2, a modulator 1 according to the present invention comprises a substrate 10 and a composite membrane 15 that are spaced from each other defining a gap 20. As shown in FIG. 2, which is a plan view of the modulator 1, the membrane 15 is suspended over the substrate 10 by support arms 25. The supports arms 25 are in turn supported by a nonconductive support layer 12. In other embodiments, discrete support arms 25 are not present. Rather, the membrane 15 itself overlaps the nonconductive support layer 12. An example of a modulator having a membrane that overlaps the support layer is provided in Ser. No. 08/565,453 filed Feb. 1, 1996, and assigned to the present assignee. That application, and all other publications mentioned in this specification are incorporated by reference herein.

Figure 3:
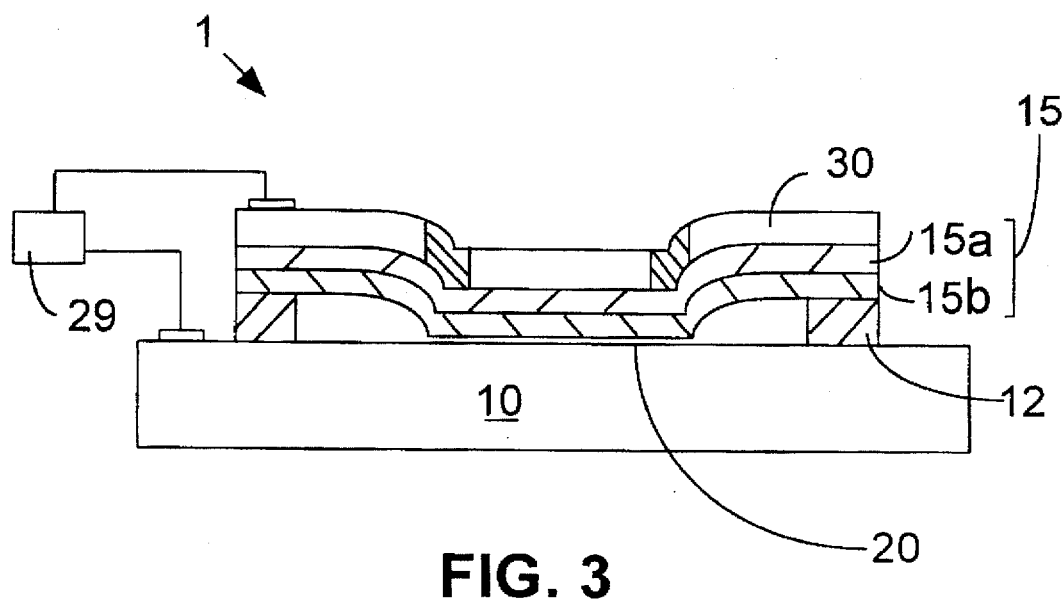
FIG. 3 shows the exemplary modulator of FIGS. 1 & 2 in a biased state.

The electrically isolated membrane 15 and the substrate 10 are electrically connected to a controlled voltage source 29. Applying a voltage to the membrane 15 and substrate 10 generates an electrostatic force that moves the membrane 15 from its "unbiased" or "quiescent" position toward the substrate 10. Under applied voltage, the membrane 15 settles in a "biased" position, as shown in FIG. 3. As the membrane 15 moves, the size of the gap 20 changes, resulting in a change in the reflectivity of the modulator 1. Such a change in reflectivity alters the measured amplitude of an optical signal reflected from the modulator. The changing reflectivity of the modulator 1 may thus be used to modulate an optical signal.

Preferably, the substrate 10 is a conductive material that is either transparent or absorbing over the operating optical bandwidth. Suitable materials include, without limitation, silicon, germanium, gallium arsenide, indium phosphide, and indium tin oxide (ITO) coated glass. If the substrate is a semiconductor, it should preferably be appropriately doped to enhance device speed. For example, if the substrate is silicon, it is preferably doped with any Group III or Group V element, typically phosphorous or boron. Those skilled in the art are familiar with such techniques.

If the substrate is a material that is insufficiently conductive for a modulator according to the present invention, conductivity can be increased or imparted by suitably doping the substrate 10. Doping methods include ion implantation, selective diffusion and other methods known to those skilled in the art.

The membrane 15 is comprised of an overlayer 15a and an underlayer 15b. The underlayer 15b, in conjunction with the substrate 10 control the optical properties of modulator 1. The thickness of the underlayer 15b is one-quarter of a wavelength, $\lambda$, of the optical signal being processed, as measured in the layer 15b. If the modulator processes an optical signal consisting of a plurality of wavelengths, the thickness of the underlayer 15b is one-quarter of the center wavelength of the operating optical bandwidth.

Moreover, in preferred embodiments, the layer 15b has a refractive index, $n_u$, that is about equal to the square root of the refractive index, $n_s$, of the substrate 10. The layer 15b must be transparent to the optical signal being modulated. Suitable materials for the underlayer 15b include, without limitation, silicon oxide, polysilicon, or, more preferably, silicon nitride.

It should be appreciated that the refractive index of the underlayer 15b may have to be specifically tailored to satisfy $n_u = n_s^{0.5}$. Methods for tailoring the refractive index of materials, such as silicon nitride, are known to those skilled in the art. See, for example, Walker et al., "Gas Composition Dependence of Silicon Nitride Used as Gallium Diffusion Barrier During GaAs Molecular Beam Epitaxy Growth on Si Complementary Metal Oxide Semiconductor," v.23 (10) J. Elec. Mat., pp. 1081–83 (1994).

Since the preferred material for the layer 15b is silicon nitride, which is nonconductive, conductivity is preferably provided to the membrane by the overlayer 15a. The overlayer 15a must be transparent over the operating bandwidth, and has a refractive index about equal to that of the substrate 10. In preferred embodiments, polysilicon is used for the overlayer 15a. While conductivity could be imparted by depositing a metal or other conductive material on a nonconductive overlayer 15a, this increases membrane mass thereby decreasing modulator speed. Moreover, unlike typical modulators, a modulator 1 according to the present invention incorporates an overlayer 15a having a thickness that is less than one-quarter of the operating wavelength. This reduces overall membrane thickness and mass, thereby increasing modulator speed.

Micromechanical modulators including some of the features of the present modulator have been described in a prior patent and prior patent applications by the present inventor, such as, for example, in U.S. Pat. No. 5,500,761, and in patent application Ser. No. 08/479,476, now U.S. Pat. No. 5,589,974. Such modulators included membranes characterized by quarter-wavelength layers and further characterized by a layer having a refractive index about equal to the square root of the refractive index of the substrate. For such modulators, relative reflectivity maxima are encountered when the gap 20 is equal to odd integer multiples of one-quarter of the operating wavelength, i.e., m$\lambda$/4 where m=1, 3, 5 . . . . Furthermore, such modulators will exhibit relative reflectivity minima when the gap 20 is 0 or an even integer multiple of one-quarter of the operating wavelength, i.e., m$\lambda$/4 where m=0, 2, 4 . . . .

Since, in a modulator I according to the present invention, the thickness of the layer 15a is not one quarter of the operating wavelength, the size of the gap 20 for zero reflectivity is no longer given by m$\lambda$/4 where m=0, 2, 4 . . . . This results from the phase change that is caused by the change in round-trip path length of the optical signal through the membrane 15. For preferred modulators in which $n_u \approx n_s^{0.5}$, as the thickness of the overlayer 15a is increased from zero, the gap 20 required for zero reflectivity decreases by an amount equal to $n_o s$, where s is the thickness of the overlayer 15a. Thus, for such a modulator, the gap 20 required for zero reflectivity as a function of s is given by:

$$d_o = m\lambda/4 - n_o s, \quad [1]$$

where m is an even integer. Expression [1] applies where $n_u \approx (n_s)^{0.5}$.

In other embodiments of the present invention, a modulator can be fabricated wherein the refractive index, $n^u$, of the underlayer 15b is not about equal to the square root of the refractive index of the substrate, $n_s$. It has been empirically determined that for such embodiments, expression [1] should be perturbed by a factor of $+(n_u - n_s^{0.5})$ ($\lambda$/10) sin $(4\pi n_o s/\lambda)$, as given below:

$$d_o = m\lambda/4 - n_o s + (n_u - n_s^{0.5})(\lambda/10) \sin(4\pi n_o s/\lambda), \quad [2]$$

where m is an even integer. Expression [2] applies within the range of about 0.7 $(n_s)^{0.5} \leq n_u \leq 1.3(n_s)^{0.5}$. Note that when $n_u = n_s^{0.5}$, the contribution of the factor equals zero, so that $d_o$ is the same value for expression [1] or [2]. Thus, either expression [1] or [2] can be used when $n_u = n_s^{0.5}$.

Thus, a modulator 1 according to the present invention is designed so that in one of either the biased or unbiased position, the gap is given by expression [1] or [2], as appropriate. When the membrane is in the other position, the gap 20 is such that the modulator exhibits a relative maxima in reflectivity. The highest attainable reflectivity for such a micromechanical modulator is in the range of about 70 to 80 percent reflectivity.

It should be recognized that if zero reflectivity is obtained in one of the membrane positions, i.e., at one value of the gap 20, then, theoretically, the modulator 1 will have infinite contrast. As such, the "maximum" reflectivity state of the modulator need not be a true maxima of the reflectivity curve to achieve acceptable performance. In some embodiments, it is advantageous to operate the modulator so that in the "maximum" reflectivity state, some amount less than theoretical maximum reflectivity is achieved. For example, the modulator may be designed for a gap, which, in the quiescent state, has a size such that application of a convenient voltage across the modulator moves the membrane 15 to a zero reflectivity position. Such a design may dictate that the "maximum" reflectivity state, which occurs in the quiescent position, achieves substantially less than 70 to 80 percent reflectivity. Furthermore, as described in Ser. No. 08/479,476, an instability exists when the membrane travels a distance, under bias, that is one-third or more of the size of the gap in the quiescent state. As such, if zero reflectivity is achieved in the biased state, then the gap 20 may be sized so that when the modulator is in its quiescent state, less than the theoretical maximum reflectivity is attained but the instability is avoided.

FIG. 4 shows a contour plot of overall reflectivity as a function of gap size and overlayer thickness. FIG. 4 is based on an operating wavelength, $\lambda$, of 1.55 µm or 15,500 angstroms, a substrate and overlayer refractive index of 3.5, and an underlayer refractive index of 1.87. As confirmed by FIG. 4, at an overlayer thickness of zero, i.e., no overlayer present, relative maxima and minima reflectivity states are given by the familiar relation for the size of the gap 20, $m\lambda/4$, where relative reflectivity maxima are encountered when m=1, 3, 5 . . . , and relative reflectivity minima are encountered when m=0, 2, 4 . . . For example, a reflectivity maxima is encountered at a gap 20 of about 3,900 angstroms and a reflectivity minima is encountered at 7,800 angstroms. This corresponds, respectively to $m\lambda/4$ where m=1 (15,550/4=3,875 angstroms) and $m\lambda/4$ where m=2 (15,550/2=7,750 angstroms).

As described above, for an overlayer 15a having other than a quarter-wave thickness, and an $n_u=(n_s)^{0.5}$, the reflectivity maxima and minima are encountered when the gap 20 has a size given by: $d_o=m\lambda/4-n_o s$, where, for maxima, m is an odd integer, and for minima, m is an even integer. For example, given an overlayer thickness of $\lambda/8$, a reflectivity maxima and minima can be determined as follows. First, the thickness of overlayer 15a is 15,500/(8×3.5)=554 angstroms, wherein the value of 3.5 is the refractive index of the overlayer. Since the thickness of the layer, as a fraction of the operating wavelength, $\lambda$, is calculated within the layer, the refractive index of the layer must be included in the calculation. Thus, a reflectivity maxima should be encountered at $m\lambda/4-n_o s$, where m equals 1 or (1×15,500)/4−3.5(554)=1936 angstroms. That maxima is identified by the reference numeral 105 in FIG. 4. A reflectivity minima should be encountered at $m\lambda/4-n_o s$, where m equals 2 or (2×15,500)/4−3.5(554)=5811 angstroms. That minima is identified by the reference numeral 110 in FIG. 4.

Figure 5:
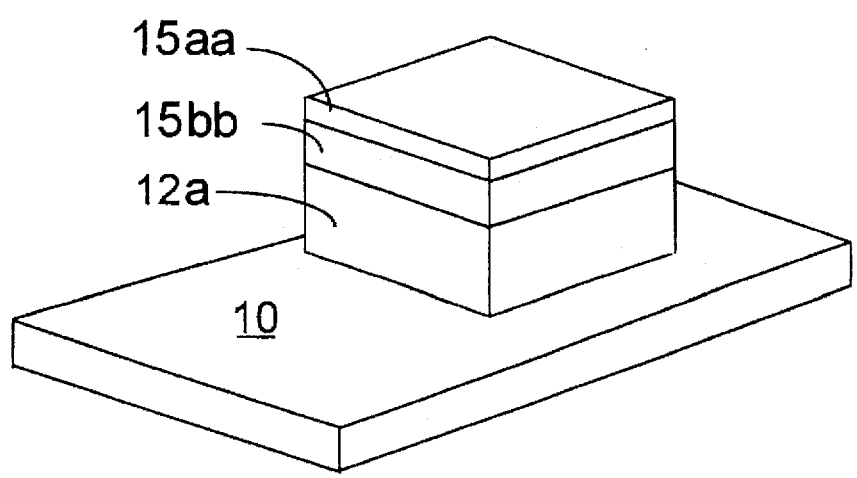
FIG. 5 shows the various materials layers deposited on a substrate prior to patterning.

The optical modulator 1 can be formed using standard photolithographic processing techniques, as follows. FIG. 5 shows the substrate with the appropriate layers disposed thereon for patterning the modulator.

The substrate 10, which may be in the form of a wafer, is preferably doped with phosphorous or boron. A sacrificial layer 12a of erodible material is deposited upon the substrate 10. The erodible material is selected so that a suitable wet etch will erode this material at a much greater rate than any of the other layers that comprise the modulator 1. Suitable erodible materials include, without limitation, phosphosilicate glass (PSG), silicon dioxide and aluminum. The sacrificial layer 12a is deposited to a thickness equivalent to size of the gap 20 when the modulator is quiescent, that is, when no voltage is applied. In a presently preferred embodiment, the thickness of the gap 20 for the above condition is in the range of about 20 to 30 percent larger than gap 20 at a reflectivity minima, as given above. This will allow the modulator to be driven by a convenient voltage of about 30 volts.

The various layers comprising the membrane 15 are then deposited. First, the layer 15bb is deposited, preferably to a thickness of $\lambda/4$, as measured in the layer, on the sacrificial layer 12a. The layer 15aa is then deposited on the layer 15bb, to a desired thickness that is less than $\lambda/4$ and which may be a function of manufacturability issues, of the mechanical response of the modulator or of conductivity. The layer 15bb is deposited under conditions appropriate for tailoring its refractive index. Such conditions are known to those skilled in the art. The aforementioned layers are then patterned according to well known photolithographic techniques to define the various features of the modulator 5, such as the nonconductive support layer 12, the membrane layers 15a and 15b, and, in some embodiments, support arms 25.

Further description of exemplary fabrication methods generally suitable for use in making the present modulator are disclosed in U.S. Pat. No. 5,500,761, and co-pending U.S. patent applications Ser. No. 08/283,106 filed Jul. 29, 1994, now U.S. Pat. No. 5,636,052, Ser. No. 08/578,590 filed Jun. 7, 1995, Ser. No. 08/479,476 filed Jun. 7, 1995, Ser No. 08/578,123 filed Dec. 26, 1995, Ser. No. 08/565,453 and Ser. No. 08/597,003, now U.S. Pat. No. 5,659,418 all of which are assigned to the present assignee. It will be appreciated that, depending upon the embodiment, the methods described in the aforementioned patent and patent applications may have to be modified for the present modulator. Such modifications are within the capabilities of those skilled in the art. For example, the size of the gap 20 in the biased and unbiased state, as well as the thickness of the overlayer 15a should be determined according to the present teachings, and the modulator fabricated accordingly.

Figure 6:
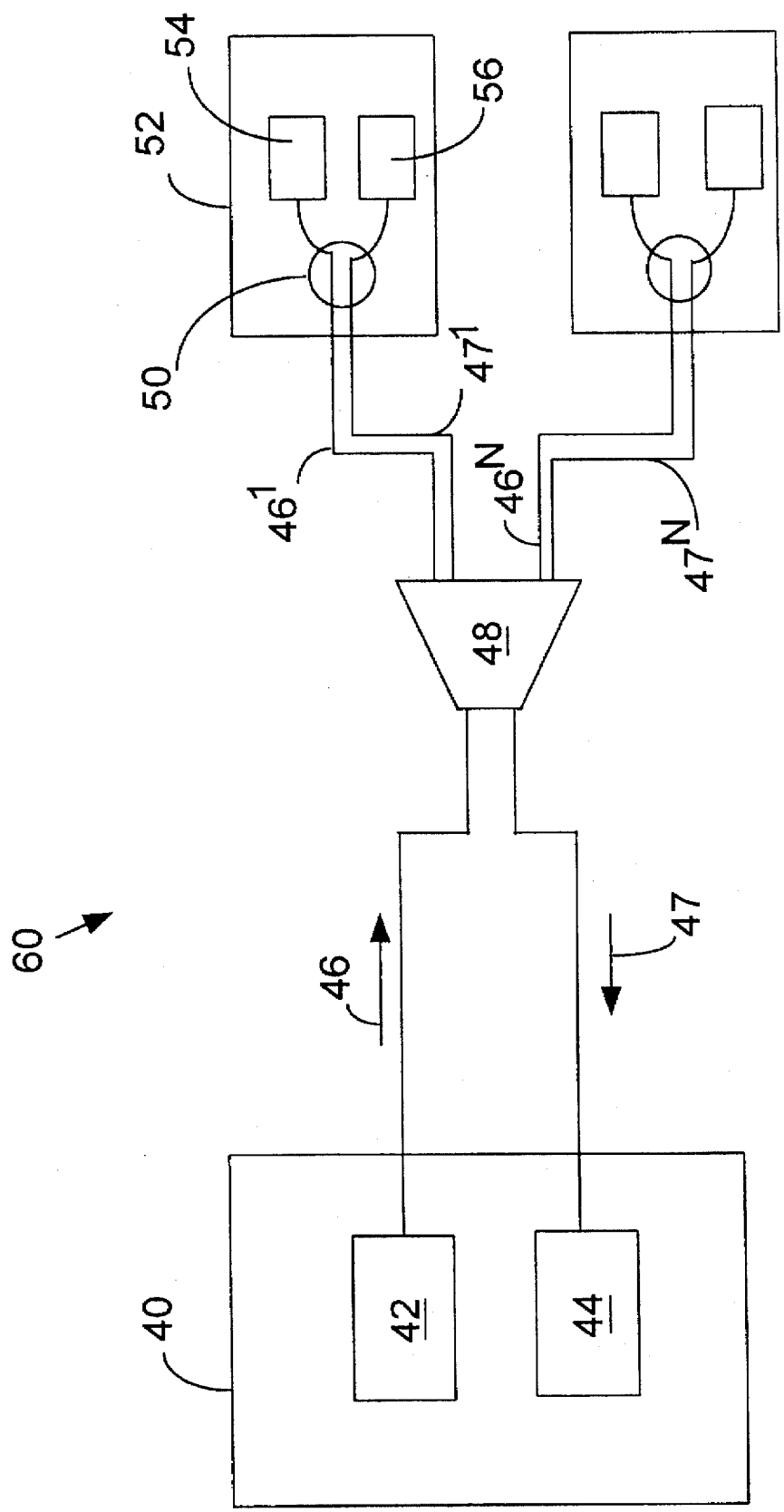
FIG. 6 shows a modulator according to the present invention integrated in a passive optical network.

Optical modulators according to the present invention can be advantageously used in optical communications systems, such as the passive optical network (PON) 60 shown in FIG. 6. The exemplary PON 60 includes a central office 40 that has an active optical source 42, such as a multi-frequency laser or light emitting diode (LED). The central office 40 sends packetized information via an optical signal 46, in wavelength-division-multiplexed (WDM) format, to a plurality of optical network units (ONU) 52. Each ONU 52 receives such information on a prescribed wavelength, $\lambda_n$. A wavelength routing device 48 demultiplexes or resolves the optical signal 46 into its spectral components $46^{1-N}$, and routes each of such spectral components to the appropriate ONU 52, wherein the spectral component having a wavelength matching the prescribed wavelength of the ONU is routed to that ONU.

As previously noted, information is sent in "packets" via the optical signal 46. Each packet contains a portion of information as well as a portion of continuous-wave (CW) light or "optical chalkboard." A splitter 50 in each ONU 52 sends a first portion of the received signal to a receiver 54, such as a photodetector, and a second portion of the received signal to an optical modulator 56, such as the optical modulators of the present invention. The modulator 56 imprints information on the optical chalkboard, returning a signal $47^{1-N}$. Each of the signals $47^{1-N}$ returned from the ONUs 52 is multiplexed by the wavelength routing device 48 into a signal 47, that is routed to a receiver 44 in the central office 40. While in the present embodiment, the wavelength routing device 48 is operable to demultiplex, as well as multiplex the optical signal, two separate devices could be used to accomplish these two operations.

Although a number of specific embodiments of this invention have been shown and described herein, it is to be understood that such embodiments are merely illustrative of the many possible specific arrangements that can be devised in application of the principles of this invention. Numerous and varied other arrangements can be devised in accordance with these principles by those of ordinary skill in the art without departing from the scope and the spirit of the invention.

I claim:

1. A micromechanical optical modulator for modulating an optical signal, the signal characterized by a wavelength, comprising:

a substrate characterized by a first refractive index;

a movable layer comprising an overlayer and an underlayer, wherein the underlayer is characterized by a thickness about equal to one-quarter of the wavelength of the optical signal as measured in the underlayer, and further characterized by a second refractive index; and the overlayer is characterized by a thickness that is less than one-quarter of the wavelength of the optical signal as measured in the overlayer, and further characterized by a third refractive index that is about equal to the first refractive index; and a support for positioning the movable layer in a spaced and superposed relation to the substrate defining a gap, wherein, of the overlayer and the underlayer, the underlayer is proximal to the substrate, and wherein, the movable layer is movable between a first position wherein the gap is characterized by a first size and a second position wherein the gap is characterized by a second size, wherein, one of either the first size or the second size of the gap is given by $d=m\lambda/4-n_o s+(n_u-n_s^{0.5})(\lambda/10)\sin(4\pi n_o s/\lambda)$, where m is an even integer, $\lambda$ is the wavelength of the optical signal, $n_s$ is the first refractive index, $n_u$ is the second refractive index, $n_o$ is the third refractive index, and s is the thickness of the overlayer.

2. The modulator of claim 1 further comprising a controllable voltage source for applying a voltage to the movable layer and the substrate.

3. The modulator of claim 1 wherein the movable layer is a membrane.

4. The modulator of claim 3 further comprising support arms attached at a first end to the membrane and supported at a second end by the support.

5. The modulator of claim 1 wherein the second size of the gap is given by $d=m\lambda/4-n_o s+(n_u-n_s^{0.5})(\lambda/10)\sin(4\pi n_o s/\lambda)$, where m is an even integer and the first size of the gap is in the range of about 1.2d to 1.3d.

6. The modulator of claim 5 wherein m=2.

7. The modulator of claim 1 wherein the underlayer is silicon nitride.

8. The modulator of claim 1 wherein the overlayer is polysilicon.

9. The modulator of claim 1 wherein the substrate is silicon.

10. A method for forming a micromechanical optical modulator for modulating an optical signal characterized by a wavelength, the modulator including a movable two-layer membrane having a first position and a second position relative to a substrate, which substrate is characterized by a first refractive index, comprising the steps of:

(a) forming the movable two-layer membrane having an underlayer and an overlayer so that the thickness of the overlayer is less than one-quarter of the wavelength of the optical signal as measured in the overlayer, and wherein the overlayer is characterized by a third refractive index which is about equal to the first refractive index and the underlayer is characterized by a second refractive index; and (b) forming a support on the substrate, the support for positioning the membrane in spaced and superposed relation to the substrate, wherein the support is formed so that in one of either the first or the second position, the space between the membrane and the substrate is given by $d=m\lambda/4-n_o s+(n_u-n_s^{0.5})(\lambda/10)\sin(4\pi n_o s/\lambda)$, where m is an even integer, $\lambda$ is the wavelength of the optical signal, $n_s$ is the first refractive index, $n_u$ is the second refractive index, $n_o$ is the third refractive index, and s is the thickness of the overlayer.

11. A micromechanical optical modulator for modulating an optical signal, the signal characterized by a wavelength, comprising:

a substrate characterized by a first refractive index;

a movable layer comprising an overlayer and an underlayer, wherein the underlayer is characterized by a thickness about equal to one-quarter of the wavelength of the optical signal as measured in the underlayer, and further characterized by a second refractive index that is about equal to the square root of the first refractive index, and the overlayer is characterized by a thickness that is less than one-quarter of the wavelength of the optical signal as measured in the overlayer, and further characterized by a third refractive index that is about equal to the first refractive index; and a support for positioning the movable layer in a spaced and superposed relation to the substrate defining a gap, wherein, of the overlayer and the underlayer, the underlayer is proximal to the substrate, and wherein, the movable layer is movable between a first position wherein the gap is characterized by a first size and a second position wherein the gap is characterized by a second size, wherein, one of either the first size or the second size of the gap is given by $d=m\lambda/4-n_o s$, where m is an even integer, $\lambda$ is the wavelength of the optical signal, $n_o$ is the third refractive index, and s is the thickness of the overlayer.

12. The modulator of claim 11 further comprising a controllable voltage source for applying a voltage to the movable layer and the substrate.

13. The modulator of claim 11 wherein the movable layer is a membrane.

14. The modulator of claim 13 further comprising support arms attached at a first end to the membrane and supported at a second end by the support.

15. The modulator of claim 11 wherein the second size of the gap is given by $d=m\lambda/4-n_o s$, where m is an even integer and the first size of the gap is in the range of about 1.2d to 1.3d.

16. The modulator of claim 15 wherein m=2.

17. The modulator of claim 11 wherein the underlayer is silicon nitride.

18. The modulator of claim 11 wherein the overlayer is polysilicon.

19. The modulator of claim 11 wherein the substrate is silicon.

20. A micromechanical modulator for modulating an optical signal characterized by a wavelength, comprising:

a two-layer membrane consisting of an underlayer and an overlayer, the two-layer membrane supported above a substrate and forming a gap therebetween, wherein, the membrane is capable of moving between a first position wherein the gap has a first size and a second position wherein the gap has a second size, wherein the underlayer has a thickness about equal to one-quarter of the wavelength of the optical signal, as measured in the underlayer, and the overlayer has a thickness less than one-quarter of a wavelength of the optical signal, as measured in the overlayer, and one of either the first or the second size of the gap is given by $d=m\lambda/4-n_o s+(n_u-n_s^{0.5})(\lambda/10)\sin(4\pi n_o s/\lambda)$, wherein m is an even integer, $\lambda$ is the wavelength of the optical signal, $n_s$ is a refractive index of the subtrate, $n_u$ is a refractive index of the underlayer, $n_o$ is a refractive index of the overlayer, and s is the thickness of the overlayer.

21. A method for forming a micromechanical optical modulator for modulating an optical signal characterized by a wavelength, the modulator including a movable two-layer membrane having a first position and a second position relative to a substrate, which substrate is characterized by a first refractive index, comprising the steps of:

(a) forming the movable two-layer membrane having an underlayer and an overlayer so that the thickness of the overlayer is less than one-quarter of the wavelength of the optical signal as measured in the overlayer, and wherein the overlayer is characterized by a third refractive index that is about equal to the first refractive index and the underlayer is characterized by a second refractive index that is about equal to the square root of the third refractive index; and (b) forming a support on the substrate, the support for positioning the membrane in spaced and superposed relation to the substrate, wherein the support is formed so that in one of either the first or the second position, the space between the membrane and the substrate is given by $d=m\lambda/4-n_o s$, where m is an even integer, $\lambda$ is the wavelength of the optical signal, $n_o$ is the third refractive index, and s is the thickness of the overlayer.

22. An optical communications network comprising:

a head end terminal;

a transmitter for launching optical signals, intended for at least one of a plurality of individual subscribers, into an optical medium;

at least one receiver for receiving optical signals from at least one of the plurality of individual subscribers; and a plurality of optical network units, each of said optical network units including a receiver for receiving optical signal portions intended for one of the plurality of individual subscribers, and a modulator for modulating a portion of the received optical signal portions with information for transmission to the head end terminal, the modulator having a two-layer membrane consisting of an underlayer and an overlayer, the two-layer membrane supported above a substrate and forming a gap therebetween, the membrane capable of moving between a first position wherein the gap has a first size and a second position wherein the gap has a second size, wherein the underlayer has a thickness about equal to one quarter wavelength of the optical signal portion received by the modulator, as measured in the underlayer, and the overlayer has a thickness less than one quarter wavelength of the optical signal portion, as measured in the overlayer, and one of either the first or the second size of the gap is given by $d=m\lambda/4-n_s s+(n_u-n_s^{0.5})$ $(\lambda/10)$ sin $(4\pi n_o s/\lambda)$, wherein m is an even integer, $\lambda$ is the wavelength of the optical signal portion received by the modulator, $n_s$ is a refractive index of the subtrate, $n_u$ is a refractive index of the underlayer, $n_o$ is a refractive index of the overlayer, and s is the thickness of the overlayer.

23. A method of operating an optical communications network, comprising the steps of:

(A) launching, at a head end terminal, an optical signal intended for at least one of a plurality of individual subscribers into an optical medium;

(B) receiving portions of optical signals launched into the optical medium at an optical network unit; and (C) modulating a portion of the received optical signal portions, for transmission to the head end terminal, with a modulator, the modulator including a two-layer membrane consisting of an underlayer and an overlayer, the two-layer membrane supported above a substrate and forming a gap therebetween, the membrane capable of moving between a first position wherein the gap has a first size and a second position wherein the gap has a second size, wherein the underlayer has a thickness about equal to one quarter wavelength of the optical signal portion received by the modulator, as measured in the underlayer, and the overlayer has a thickness less than one quarter wavelength of the optical signal portion, as measured in the overlayer, and one of either the first or the second size of the gap is given by $d=m\lambda/4-n_s s+(n_u-n_s^{0.5})$ $(\lambda/10)$ sin $(4\pi n_o s/\lambda)$, wherein m is an even integer, $\lambda$ is the wavelength of the optical signal portion received by the modulator, $n_s$ is a refractive index of the subtrate, $n_u$ is a refractive index of the underlayer, $n_o$ is a refractive index of the overlayer, and s is the thickness of the overlayer.

24. The method of claim 23, further including the step of:

receiving, at the head end terminal, the modulated optical signal.

* * * * *